US005778960A

United States Patent [19]
Jackson et al.

[11] Patent Number: 5,778,960
[45] Date of Patent: *Jul. 14, 1998

[54] METHOD FOR PROVIDING AN EXTENSION ON AN END OF AN ARTICLE

[75] Inventors: Melvin Robert Jackson, Niskayuna; Bernard Patrick Bewlay, Schenectady; Dennis Joseph Dalpe, Niskayuna, all of N.Y.; Wayne Alan Demo, Hamilton; Stephen Joseph Ferrigno, Cincinnati, both of Ohio

[73] Assignee: General Electric Company, Schenectady, N.Y.

[*] Notice: The term of this patent shall not extend beyond the expiration date of Pat. No. 5,676,191.

[21] Appl. No.: 538,152

[22] Filed: Oct. 2, 1995

[51] Int. Cl.⁶ .......................... B22D 19/10; B22D 23/06
[52] U.S. Cl. .......................... 164/98; 29/889.1; 148/404; 164/92.1; 164/122.1
[58] Field of Search .......................... 164/92.1, 98, 122.1, 164/122.2; 29/889.1, 402.07, 402.18; 148/404, 562

[56] References Cited

U.S. PATENT DOCUMENTS

| | | |
|---|---|---|
| 2,879,189 | 3/1959 | Shockley . |
| 3,302,252 | 2/1967 | Woodburn, Jr. . |
| 3,471,266 | 10/1969 | LaBelle, Jr. .......................... 23/301 |
| 3,967,353 | 7/1976 | Pagnotta et al. .......................... 29/156.8 R |
| 4,010,531 | 3/1977 | Andersen et al. .......................... 29/156.8 H |
| 4,033,792 | 7/1977 | Giamei et al. .......................... 148/32 |
| 4,120,742 | 10/1978 | Asano et al. .......................... 156/608 |
| 4,784,715 | 11/1988 | Stoll . |
| 4,869,645 | 9/1989 | Verpoort .......................... 164/103 X |
| 4,937,053 | 6/1990 | Harvey .......................... 422/249 |
| 4,944,925 | 7/1990 | Yamauchi et al. . |
| 5,047,112 | 9/1991 | Ciszek . |
| 5,193,272 | 3/1993 | Wortmann et al. .......................... 164/103 X |
| 5,291,937 | 3/1994 | Corderman et al. .......................... 164/92.1 |
| 5,304,039 | 4/1994 | Corderman et al. .......................... 416/241 |
| 5,611,670 | 3/1997 | Yoshinari et al. .......................... 164/122.1 X |
| 5,676,191 | 10/1997 | Bewlay et al. .......................... 164/92.1 X |

FOREIGN PATENT DOCUMENTS

| | | |
|---|---|---|
| 0454151 | 10/1991 | European Pat. Off. . |
| 0476389 | 3/1992 | European Pat. Off. . |
| WO91/16476 | 10/1991 | WIPO . |

OTHER PUBLICATIONS

R. Brink, et al. "Vacuum Induction Remelting and Shape Castingg" *Metals Handbook*, 9th Edition, vol. 15, pp. 399–401, 1988.

Gary L. Erickson. "Polycrystalline Cast Superalloys". *Metals Handbook*, 10th Edition, vol. 1, 1990, pp. 981–994.

K. Harris et al., "Directionally solidified and Single–Crystal Superalloys". *Metals Handbook*, 10th Edition, vol. 1, 1990, pp. 995–1006.

*Primary Examiner*—J. Reed Batten, Jr.
*Attorney, Agent, or Firm*—Ernest G. Cusick; Noreen C. Johnson

[57] ABSTRACT

An extension is formed directly on the end of an article by dipping the end into a molten bath of an alloy, followed by withdrawal of the end at a rate sufficient to form the extension. Extensions formed have a microstructure that is continuous and compatible with that of the article. Such microstructures may include epitaxial growth of the extension onto the microstructure of the article. The method establishes a temperature gradient within the article that may be controlled by heating and/or cooling the article during the practice of the method.

22 Claims, 7 Drawing Sheets

METHOD FOR PROVIDING AN EXTENSION ON AN END OF AN ARTICLE

This application is related to commonly assigned U.S. Pat. No. 5,673,744 issued Oct. 7, 1997 to Bewlay et al., U.S. Pat. No. 5,673,745 issued Oct. 7, 1997 to Bewlay et al., U.S. Pat. No. 5,676,191 issued Oct. 14, 1997 to Bewlay et al., and U.S. Ser. Nos. 08/538,152 filed Oct. 2, 1995 and 08/588,587 filed Jan. 18, 1996, the contents of which are fully incorporated herein.

FIELD OF THE INVENTION

This invention relates generally to a method for providing an extension on an end of an article. More particularly, it is a method for providing an extension having a compatible alloy composition on an end of an article having a directionally oriented microstructure and a superalloy composition, and yet more particularly, to such a method in which an end of the article is used as a growth seed for the directional solidification of the extension directly from a molten alloy, without the use of external members to form the extension. This method may be used to repair the tips of airfoil blading members, such as turbine blades/buckets as well as vanes/nozzles and non-airfoil articles such as turbine shrouds and combustor shingles.

BACKGROUND OF THE INVENTION

The reported technology for growing directionally oriented cast structures from superalloys has evolved from processes suitable for making simple shapes and members to processes that are currently used to form articles having complex shapes, such as the directional solidification of Ni-base superalloy blading members used in the hot sections of gas turbine engines. The published literature, such as Metals Handbook Ninth Edition, Volume 15 Casting, ASM International (1988), pp. 319-323, has many examples of processes for making directionally oriented, superalloy blading members, such as turbine blades and vanes. Most of these processes utilize some form of a withdrawal-type vacuum induction casting furnace with mold susceptor heating.

In the art of casting, fluid pressure, such as an inert gas or air, has been applied within a closed container to a molten material, such as a metal, to force the molten material upwardly through a tube. A patent which discloses one such method and associated apparatus is U.S. Pat. No. 3,302,252, relating to continuous casting of an article upwardly through a pouring tube into a cooled mold. The cast article is continuously withdrawn from the mold.

Another portion of the casting art sometimes is referred to as the EFG (Edge-defined, Film-fed Growth) process. In that process, no external pressure is applied to a liquid material, but capillary action within a narrow forming tube or die is relied upon to draw the liquid material upwardly for solidification. Frequently a seed crystal is introduced into the liquid to initiate crystal growth. Typical patents which disclose features of this process include U.S. Pat. Nos. 3,471,266; 4,120,742 and 4,937,053.

In some of the above referenced patents and elsewhere in the casting art relating to the formation of directionally solidified or single crystal articles, seed crystals having selected crystal orientations (primary and/or secondary orientations) have been used. They constitute a means for initiating the solidification of an article having a desired crystal orientation. In the formation of blading members, the seed crystals are also used in conjunction with casting forms, such as ceramic molds, to define the shape and crystal orientation of the member.

Heretofore, the joining of components of single crystal or directionally solidified elongated grain articles, including turbomachinery airfoils, has generally involved the use of separately cast members of selected crystal orientation. Such members are assembled and bonded into an article across an interface between the members. U.S. Pat. Nos. 3,967,355 and 4,033,792 are typical of patents relating to this type of bonding, and the '792 patent describes the desirability of matching crystal structures across the bond interface.

By using the casting technology described above, a directionally oriented article, such as a blading member, can be formed as a single crystal or with a directionally solidified crystal structure comprising a plurality of columnar grains. Both single crystal and directionally solidified articles may be formed with preferred crystal orientations. The desired crystal orientation in nickel-base superalloys frequently used for blading members is that the <001> crystallographic direction be parallel to the length of the member, and thus substantially parallel to the growth direction, in order to minimize the elastic modulus along the length of the member, which also corresponds to the growth direction. This orientation is known to provide a good balance of the creep strength, ductility and thermal fatigue resistance of these alloys.

An example of a blading member having a complex shape of the type described above is the turbomachinery blade described in U.S. Pat. No. 4,010,531. Such a blading member comprises an airfoil-shaped outer wall having a complex hollow interior communicating with an end region, such that gases can be circulated from the hollow interior through the outer wall and end region for cooling purposes, wherein the end region comprises a tip that extends from the end of the member.

Airfoil blading members, are frequently utilized in extreme environments where they are exposed to a variety of environmentally related damage and wear mechanisms, including: erosion due to impact by high-velocity and/or high temperature airborne particles, high temperature oxidizing and/or corrosive gases, low-cycle fatigue processes and mechanical abrasion caused by rubbing against other members. These mechanisms are known to cause cracking and other damage, particularly in the end regions or tips of these members. Because the manufacturing costs for blading members are typically relatively high, it is often desirable to repair rather than to replace them after the tips have been damaged or worn. When blading members, or other articles having a directionally oriented microstructure are damaged in the tip or extended end region, whether in operation or during manufacturing, the problem of their repair becomes more complicated and difficult. This problem of repair becomes particularly acute when a directionally oriented microstructure must be maintained in the repaired portion, as is frequently desirable in directionally oriented articles such as airfoils, because of the difficulty of replicating the original directional orientation in the materials used to make the repairs.

One method that has been used for the repair of turbine blade tips, has been to add material to the damaged or worn portion of the tip by welding, or similar processes. A disadvantage of this method is that the microstructure of the weld is not directionally oriented, and thus the mechanical properties of the tip or extension are diminished as compared to the remainder of the directionally oriented microstructure of the article. Also, most current oxidation resistant materials are difficult to weld, and have been known to crack during the welding process.

Another method has been to add separately formed tips to the end of an airfoil by brazing, welding, diffusion bonding or similar bonding processes. This method is described, for example, in U.S. Pat. Nos. 3,967,355, 4,010,531 and 4,033, 792. Using such methods, it is sometimes desirable to form a crystal structure in the tip that is similar to that of the remainder of the airfoil, and to develop a microstructure in the bond that is compatible with the microstructures of both the tip and the remainder of the airfoil.

U.S. Pat. Nos. 5,291,937 and 5,304,039, which are both assigned to the assignee of this invention and are hereby incorporated by reference herein, also describe two methods for providing an extension on the end of directionally solidified article, such as a blading member. These methods both utilize a die and a die extension made from ceramic materials, and involve applying a fluid pressure to force a molten material into the die extension. The article end on which the extension is to be formed is then placed into the die opening and die extension and into contact with the molten material. The article end is held in contact with the molten material for a time sufficient for the article end to interact with the molten material, whereupon the article is withdrawn through the die opening at a rate that permits directional solidification of an extension on the end of the article. A description is given of how these methods may be used to repair blading members, particularly their end regions and extended tips.

However, it is desirable to develop other methods of providing extensions on the ends of directionally solidified articles, such as a blading members, particularly methods that do not require the apparatus described in the referenced patents, such as the ceramic die and die extension, and the means for applying fluid pressure to force the molten material into the die.

SUMMARY OF THE INVENTION

The present invention describes a method for providing an extension on an end of a superalloy article having a directionally oriented microstructure, such as a blading member, directly from a bath of a compatible molten alloy material, preferably a superalloy material. The article may also have internal passageways communicating through the end of the article on which the extension is to be added. The extension may comprise equiaxed grains, a directionally oriented crystal structure comprising a plurality of grains or a single crystal. Further, the method may be used to provide epitaxial growth of the extension, such that the directionally oriented crystal structure of the article continues into the extension. The method may also employ a sacrificial or barrier material in order to define the shape of the extension and/or prevent infiltration of the melt used to form the extension into certain portions of the article.

The invention may be briefly and generally described as a method for providing an integral extension on an end of an article, comprising the steps of: selecting an article having a base end, a transition section, an extension end having an outer cross-sectional shape, a directionally oriented microstructure and a superalloy composition, whereby the transition section joins the base end and the extension end; providing a molten material having an alloy composition that is compatible with the superalloy composition of the article; dipping the extension end of the article into the molten material; holding the extension end of the article in contact with the molten material for a time sufficient to allow a portion of the extension end to be heated by and interact with the molten material as a microstructure growth seed; and withdrawing the extension end from the molten material at a rate which causes the molten material to solidify on the growth seed at an interface between them as an integral extension having a microstructure that is compatible with the directionally oriented microstructure of the article, whereby during the step of withdrawing, the article has a temperature gradient such that the temperature decreases between the interface and the base end.

Control of the temperature gradient permits control of the microstructure of the extension. Additional control over the temperature gradient may be accomplished in this method by employing the additional steps of heating and/or cooling the article during growth of the extension.

DETAILED DESCRIPTION OF THE INVENTION

The present invention comprises a new method by which an extension may be grown directly on an end of a directionally oriented, superalloy article, through solidification of the extension from a molten bath of a superalloy material. Through use of the article itself as a seed or means for initiating growth, the method may be used to provide an extension with a crystal structure and overall microstructure that is compatible with and continuous with that of the article, including an extension having a microstructure that is generally indistinguishable from the metallurgical structure of the article from which the extension is grown. The method may be utilized to make new extensions on such articles, or to repair or replace existing extensions. While potentially useful on a wide variety of articles, the method of this invention is particularly useful in providing an extension on an article having a hollow interior and openings or passages communicating with the hollow interior through the end on which the extension is to be formed. Thus, this method is particularly useful for forming or repairing the tips of airfoil blading members, such as turbine blades.

As used herein, the term "crystal structure" is intended to mean the overall crystal morphology, such as a single crystal, multiple elongated grains and other crystal forms, and their orientations. The terms "directionally oriented", "directional orientation" or similar terms refer to strongly oriented crystal structures, including directionally solidified polycrystalline structures comprising a plurality of elongated grains and single crystals. The term "metallurgical structure", as used herein, is intended to include such characteristics as overall chemical or alloy composition, and the size, shape, spacing and composition of precipitates, phases, inclusions, dendrites, etc. within the crystal structure. For example, cast Ni-base superalloys generally include gamma prime precipitates, spaced dendrite arms and various other distinguishable phases, such as various carbide and carbonitride phases. The crystal structure and metallurgical structure can be determined and identified by a variety of known and widely used analytical techniques including chemical or spectrographic analysis and various x-ray and photomicrographic methods. The term "microstructure", as used herein, comprehends both the crystal structure and the metallurgical structure.

Figure 1:
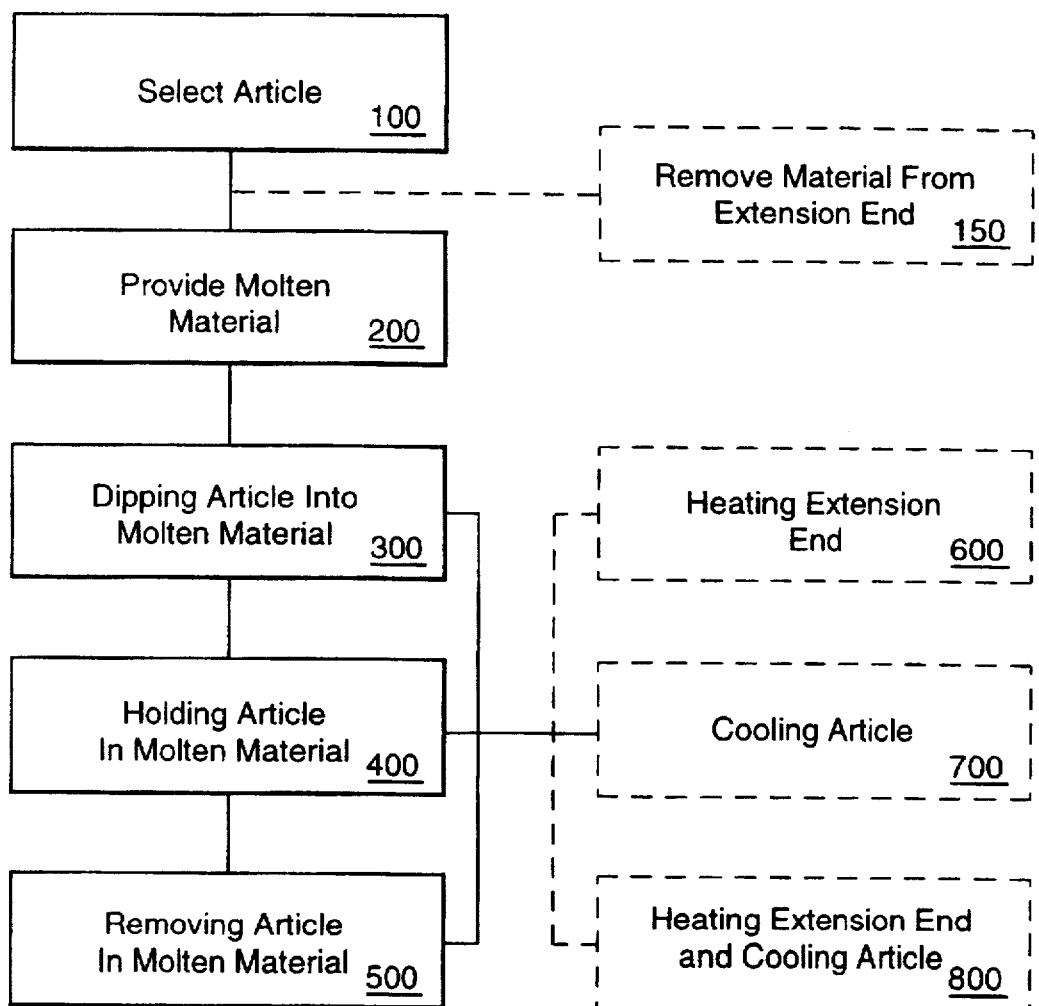
FIG. 1 is a flow diagram illustrating the method of this invention.
Figure 2A:
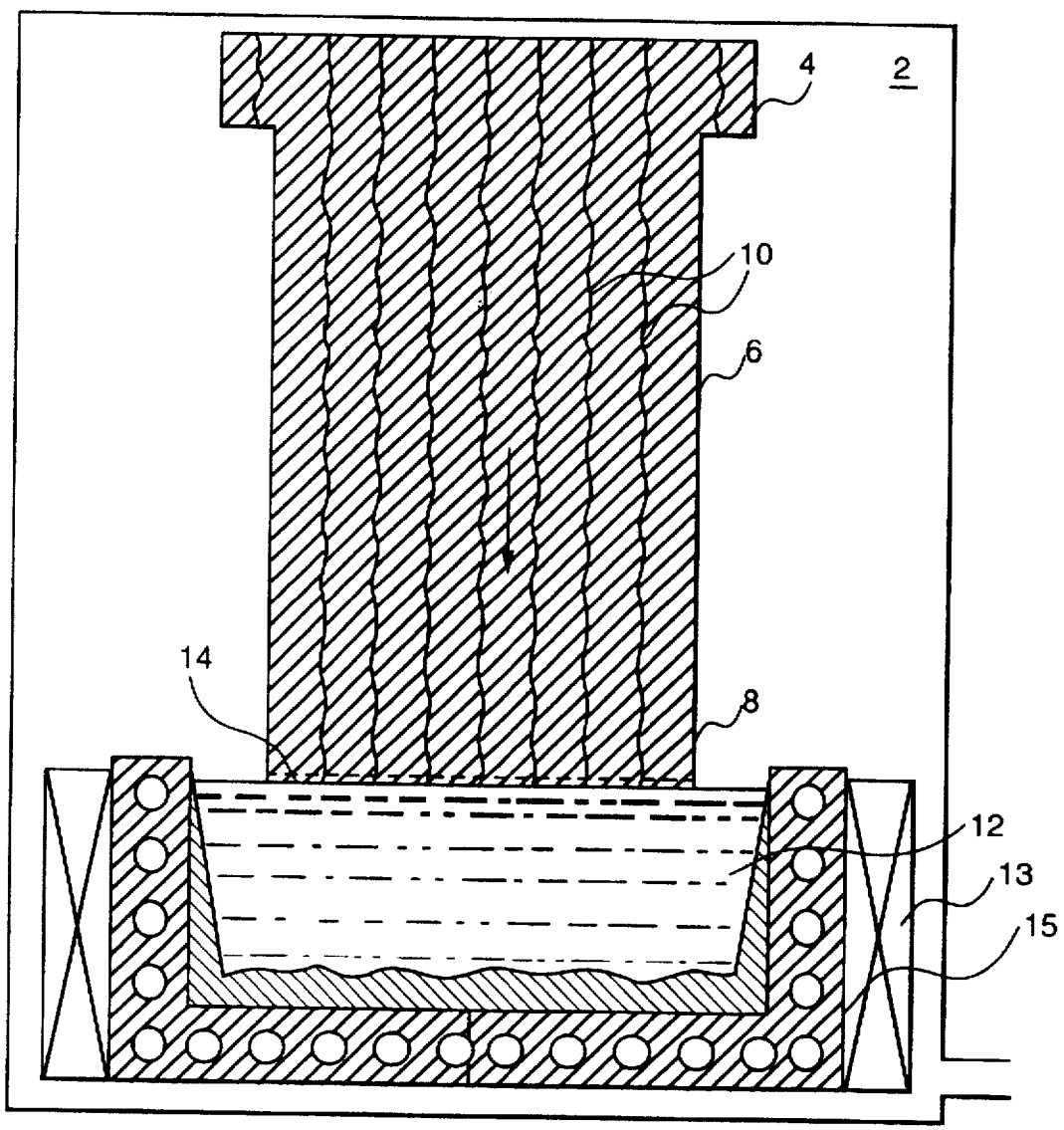
FIG. 2A is a sectional view of an apparatus adapted to practice the method of the present invention, showing an article being dipped into the melt in accordance with the method.
Figure 2B:
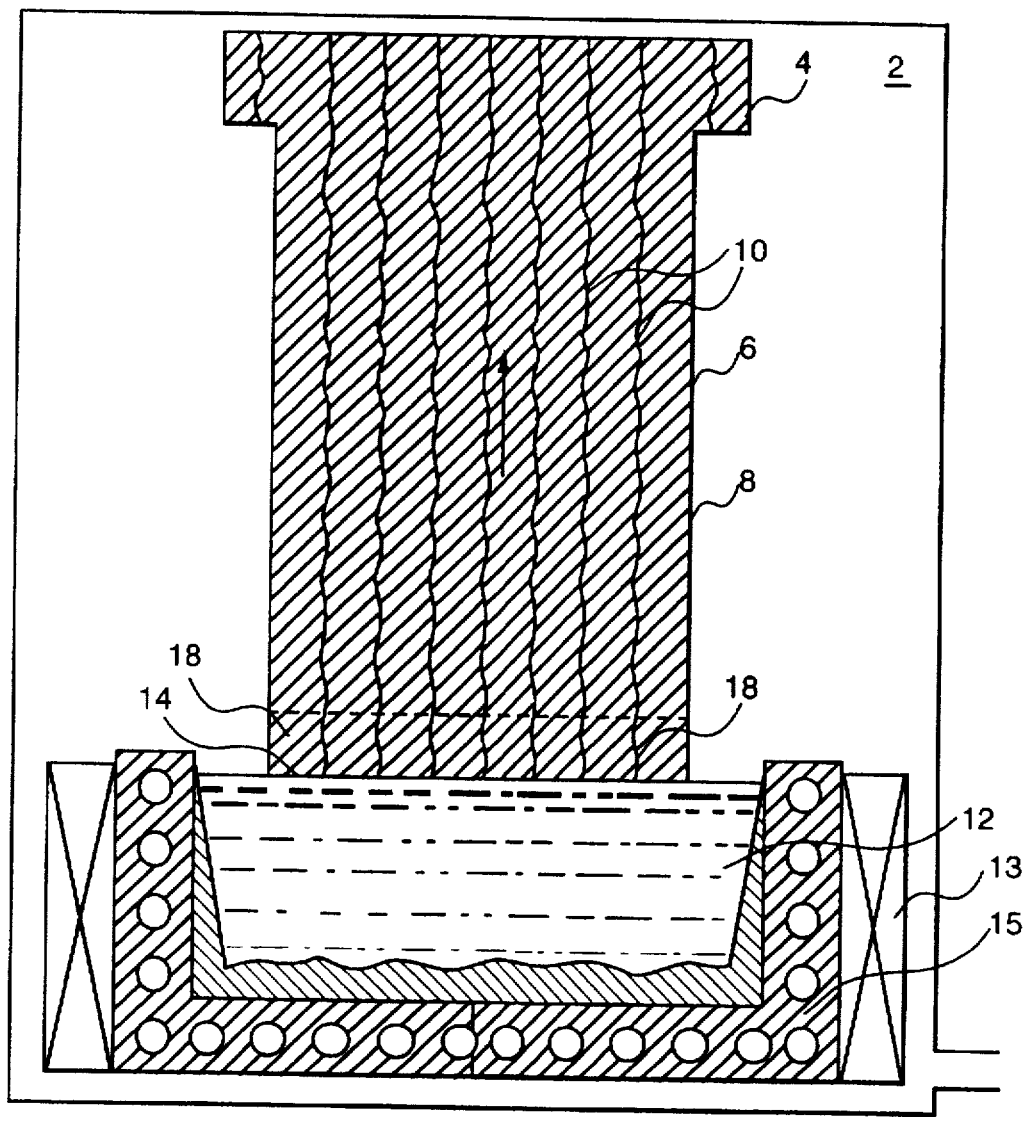
FIG. 2B is a sectional view of the apparatus of FIG. 2A, showing an article being withdrawn in accordance with the method.

As illustrated in FIGS. 1, 2A and 2B, the present invention is a method for providing an integral extension on an end of an article, comprising the steps (see FIG. 1) of: selecting 100 an article 2 having base end 4, transition section 6, extension end 8 having an outer cross-sectional shape (not shown), directionally oriented microstructure 10 and a superalloy composition, whereby transition section 6 joins base end 4 and extension end 8; providing 200 a molten material 12 having an alloy composition that is compatible with the superalloy composition of the article; dipping 300 (see FIG. 2A) extension end 8 of article 2 into molten material 12; holding 400 extension end 8 of article 2 in contact with molten material 12 for a time sufficient to allow a portion of extension end 8 to be heated by and interact with molten material 12 as a microstructure growth seed; and withdrawing 500 (see FIG. 2B) extension end 8 from molten material 12 at a rate which causes molten material 12 to solidify on the growth seed at interface 14 between them as integral extension 16 having microstructure 18 that is compatible with directionally oriented microstructure 10 of article 2, whereby during the step of withdrawing 400, article 2 has a temperature gradient such that the temperature decreases between interface 14 and base end 4.

The step of selecting 100 comprises choosing an article 2 on which an extension is to be provided. This may include selecting 100 a newly manufactured article that does not have an extension, or one which requires addition to or modification of an existing extension. It may also include selecting an article having an existing extension that has been used in an application, such as a turbine engine, and which requires modification, replacement or repair of the existing extension. As noted herein, this method is particularly useful for providing an extension on an airfoil, including an airfoil blading member such as a turbine blade or vane. A selected article 2 has a superalloy composition and directionally oriented crystal structure 10. The superalloy may have a superalloy composition of a Ni-base, Fe-base or Co-base superalloy, such as is well-known, and described, for example, in Metals Handbook Tenth Edition, Volume 1 Properties and Selection: Irons, Steels, and High-Performance Alloys, ASM International (1990), pp. 981–994 and 995–1006, which describes many castable superalloys, and specifically Ni-base superalloys that may be directionally solidified or formed as single crystals. For purposes of this patent application, acceptable superalloys would also include high temperature alloys that are not presently in widespread commercial use for blading member applications, such as Nb-base and Ti-base alloys, including Nb-Ti alloys, directionally oriented Ni-base or Nb-Ti-base composite alloys and Ni-Al alloys.

Figure 3:
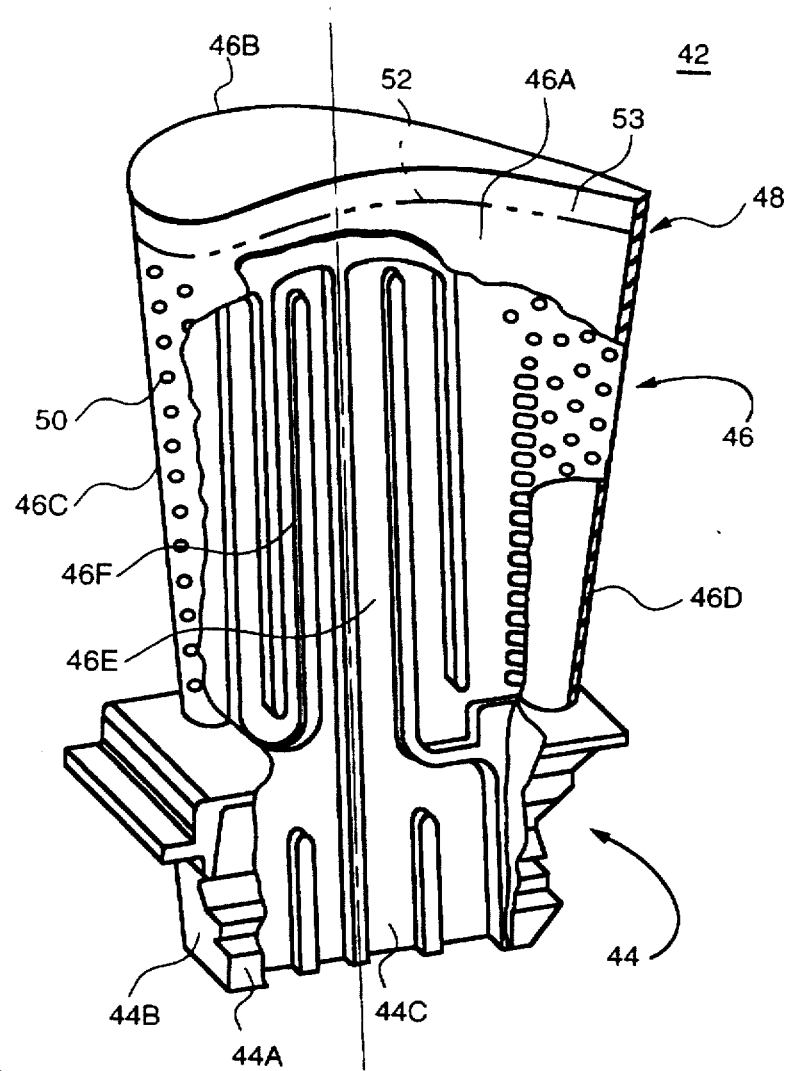
FIG. 3 is a cutaway illustration of a turbine engine turbine blade for a turbine engine, including the extension end or blade tip.
Figure 5:
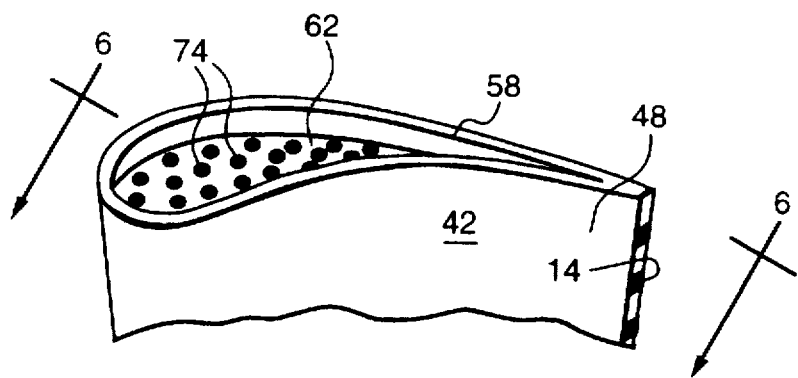
FIG. 5 is a fragmentary diagrammatic view of the blade tip portion of one example of an air cooled turbine blade.

An article 2 of the present invention may comprise many useful forms, but may be characterized generally as having base end 4, transition section 6 and extension end 8 having an outer cross-sectional shape. However, an article 2 in the context of the method of this invention is preferably an airfoil in the form of a blading member, such as a turbine blade or vane.

Where article 2 comprises an airfoil, such as a blading member in the form of turbine blade 42, as shown in FIG. 3, turbine blade 42 comprises base 44, airfoil section 46 and blade tip 48, which correspond to base end 4, transition section 6, an extension end 8, respectively. Base 44 may have many forms, but generally comprises a means for attaching blade 42 to other portions of a turbine engine such as a disk or blisk, which generally comprises features such as a shank 44A and dovetail portion 44B for making such attachment. Base 44 may also comprise a means for communicating with a hollow interior defined within the airfoil section, such as internal passageways 44C or channels. Airfoil section 46 of turbine blade 42 is well known, and generally comprises concave pressure sidewall 46A, and convex suction sidewall 46 B that connect leading edge 46C and chordwise spaced trailing edge 46D, and blade tip 48 that interconnects these elements at the outer end of the blade (see FIGS. 3 and 5). Airfoil section 46 also frequently has a partially hollow interior 46E, that communicates with internal passageways 44C in base 44 for the purpose, in use, of circulating a cooling fluid, such as air, from base 44 into airfoil section 46. This partially hollow interior typically comprises serpentine or labyrinthine shaped cooling channels 46F that communicate with the exterior of airfoil section 46 through passages or holes 50. Cooling channels 46F also frequently communicate with end wall 62 in the form of a plurality of small passageways 74 or holes through end wall 62. Passageways 74 are also used in the context of the use of article 42 in conjunction with the flow of a cooling fluid, such as air. Blade tip 48 is at the end of airfoil section 46 away from base 44. Referring to FIGS. 3 and 5, blade tip 48 may be solid (FIG. 3), or it may comprise a peripheral rim 58 and end wall 62, where rim 58 is typically on the order of 0.02–0.15 inches thick, and extends 0.02–0.25 inches beyond the outer surface of end wall 62, with the thickness and length of the extension depending on several factors, including the overall size of blade 42 (gas turbine buckets generally being much larger than jet engine blades) and the location of blade 42 within an engine. Blade tips 48 frequently become worn or damaged in service, as described herein. The cross-sectional shape of blade tip 48, or more generally extension end 8 may be any shape, including the airfoil shape as illustrated by blade tip 48 in FIGS. 3 and 5.

For selected articles that have existing extensions, such as worn, oxidized or damaged turbine blades, article 2 may optionally have a portion of extension end 8 or blade tip 48 removed to facilitate the addition of new material according to the method of this invention. This is illustrated in FIG. 1 by the optional step of removing 150 a portion of extension end 8 prior to providing 200 a molten material. For example, it may be desirable to remove heavily oxidized portions of a turbine blade tip to enhance the interaction with the molten material in the subsequent steps of the method. It may also be desirable to remove a portion of blade tip 48 in order to give the remainder of the tip a more uniform length or cross-section, and thereby for example, provide a flat surface at the end of a turbine blade tip when the tip is inserted into the molten material, thus providing a more uniform surface on which to solidify the material which forms the extension. Material could also be removed from an existing article, such as a turbine blade tip, in such a manner so as to provide a non-flat surface (e.g. sawtooth patterns, stepped patterns or other non-flat surfaces) at the end of the blade tip, and thus provide a non-uniform surface on which to solidify the material which forms the new tip. Any suitable material removal method may be used, such as grinding, sawing, machining, etching or other suitable material removal methods, provided that mechanical damage is avoided which could promote nucleation of a new grain structure during heating of the end of the article.

After selection and any optional material removal, the next step is providing 200 a molten material having an alloy composition that is compatible with the superalloy composition of the article. The molten material may be provided using any of a number of methods, such as resistance heating, induction heating, electron beam heating or other suitable methods. The heating may be done in any suitable apparatus, such as a ceramic, water-cooled copper or refractory crucible. Such heating may be done in air, but for most superalloys will preferably be done in a protective atmosphere such as argon, or in vacuum. The preferred method of providing the molten material was to use a known induction heating means 13 and water-cooled, copper crucible 15 for heating, and to perform such heating in an argon atmosphere, as illustrated in FIGS. 1. This apparatus had the advantage of avoiding potential contamination of the melt with ceramic from a ceramic crucible, and also avoided the reaction of the melt with atmospheric constituents, such as nitrogen and oxygen. The alloy composition of the molten material need only be compatible with the superalloy composition of the article, such that the remaining steps of the method provide an integral extension on the article, as described below. Generally, in the context of this invention, compatibility means some continuity or similarity of crystal structure, metallurgical structure, or both between the article and the extension solidified from the molten material. Compatibility also implies that neither alloy adversely affects the other, whether by depletion of alloying elements, contamination, liquid metal embrittlement, formation of brittle phases at the interface, or otherwise. Compatibility may also imply some limitation on discontinuities in mechanical and physical properties and metallurgical structure between the article and the extension. Ultimately, compatibility must be measured by performance. If extensions of one alloy can be repeatably grown on articles of another alloy, if the article with an extension grown thereon is amenable to subsequent manufacturing operations, and if the finished article performs satisfactorily in service, then it must be concluded that the two alloys are compatible, exceptions to the preceding generalities notwithstanding. The same considerations apply to references made herein to sacrificial additions. As used herein, the phrase "molten material compatible with . . ." is taken to mean a material or alloy that meets the preceding standard for compatibility, present in its liquid form. Since both the crystal structure and metallurgical structure of the extension may be different from that of the article, a wide latitude of compatible molten materials are possible for a given article, depending on the degree of compatibility required between article and the extension. For some applications, where it is desirable that the crystal structure and metallurgical structure of the extension closely match the article (e.g., cases where epitaxial growth is desired or where the extension must also have a directionally oriented crystal structure), the latitude will generally be narrower, such that it may be most desirable that the alloy composition of the molten material be the same, or very similar to, that of the article. For other applications, where it is not necessary that either the crystal structure and metallurgical structure of the extension match the article (e.g. cases where an equiaxed crystal structure or other non-directionally oriented crystal structure is sufficient), the latitude will generally be wider, such that the alloy composition of the molten alloy may be quite different from that of the article. Also, in some applications it may be desirable to develop a crystal structure and/or metallurgical structure that differs substantially from that of the article in order to develop different properties to address different requirements. For example, it may be desirable to have a lower modulus and enhanced creep and fatigue resistance in the article as compared to the extension, and to have higher wear and oxidation resistance in the extension. As illustrated by the hatching in FIGS. 2A and 2B, the composition of the superalloy of the article may be different from that of the extension grown on the article from the molten material. However, as reported in the referenced patents, different alloy compositions may be selected so that the crystal structure of the extension will grow integrally with and continuously from that of the article, despite their compositional differences. This mode of growth is sometimes termed epitaxial growth. In the context of the present invention, this would also describe a generally high degree of compatibility between the alloy of the article and that of the extension. Also, it is recognized that the crystal structure or the metallurgical structure of an article, or both, may vary from base end 4 to extension end 8, and that references herein to the compatibility between the article and the extension refer principally to compatibility of the extension with extension end 8 of article 2.

Referring again to FIGS. 1, 2A and 2B, following the step of providing a molten material 200 are the steps of dipping 300 (see FIG. 2A), holding 400 and withdrawing 500 (see FIG. 2B). The step of dipping 300 establishes intimate contact between the extension end of the article and the molten material, such that various known heat transfer mechanisms occur, and the temperature of the article, and particularly the extension end, rapidly begins to rise to approach the temperature of the molten material. Dipping 300 is accomplished by immersing the article into the molten material to a desired depth that will vary depending on numerous factors, including: the nature of the article such as its size and alloy, the temperature of the molten material and the configuration of the extension end (e.g. a flat versus a stepped end), wherein the maximum depth of immersion will generally be limited by the amount of melt back desired on the extension end, taking into account factors such as those noted. Dipping 300 may be done in any desired manner, either by step-wise, virtually instantaneous immersion to the desired depth, or by slowly ramping the rate of descent, or any other suitable method of dipping 300, including combinations of the methods described.

The step of holding 400 for a time sufficient to allow a portion of extension end to be heated by and interact with molten material as a microstructure growth seed is an important, and highly variable step in the method of the invention, because the amount of interaction and the degree or extent to which the extension is to serve as a growth seed may vary considerably in accordance with this method, as described herein. For some combinations of materials, apparatus and process conditions, a sufficient time for holding 400 may be essentially zero, as may be the case, for example, where a relatively small amount of interaction between the article and molten material is necessary to produce a continuous, integral extension having a microstructure that is compatible with that of the article and sufficient to satisfy the requirements of its intended application. For applications where a larger amount of interaction is desirable, such as the growth of epitaxial extensions, it is anticipated that a sufficient time for equilibration will, for most combinations of articles and molten materials, be longer, perhaps as much as 30 minutes. For applications where longer times are expected, estimates of the time necessary can be made by calculating the time necessary to melt back the desired portion of the extension end, using known or measured heat transfer information for the article and molten material alloys. The sufficiency of the time for holding 400 will also be affected by the method used for dipping 300, and the time utilized during this step.

It may be desirable to utilize means to enhance and control the interaction of the article and the molten material during dipping 300, holding 400 or both, such as the use of supplemental heating, cooling or both, as described herein. In addition, it may be desirable to provide other known means such as stirring or other agitation within the molten material, or agitation of the article, such as by ultrasonically agitating the article.

Withdrawing 500 is the step during which extension 16 is formed on extension end 8. Withdrawing 500 comprises removing extension end 8 from molten material 12 at a rate which causes molten material 12 to solidify on the growth seed at interface 14 between them as integral extension 16 having microstructure 18 that is compatible with directionally oriented microstructure 10 of article 2, whereby during the step of withdrawing 500, article 2 has a temperature gradient such that the temperature decreases between interface 14 and base end 4. Withdrawing 500 may be done at any rate, either fixed or variable, that produces the desired microstructural characteristics of extension 16, as discussed further herein. The rate of withdrawing 500 will depend upon the solidification characteristics of molten material 12 on the article 2, and will depend upon the alloy composition of both, the temperature of molten material 12, the temperature gradient within article 2 and the temperature of interface 14, and other factors.

It is preferred that these steps be done using the same apparatus. These steps may be done using any of a number of well-known dipping, holding and withdrawing means. A suitable dipping, holding and withdrawing means will typically comprise a means for holding or gripping (not shown) article 2; a drive means (not shown) for dipping article 2 into and withdrawing it from molten material 12, that is connected to the holding means; and a means for controlling (not shown) the motion of the drive means during these steps. Article 2 may be held using any suitable means for gripping the article, such as known gripping fixtures or clamping mechanisms. Preferably, dipping 300, holding 400 and withdrawing 500 will be done use an automated, programmable, computer-controlled drive means, similar to those known in the art of crystal pulling, such as those used to perform the Czochralski or Bridgman processes. It is also desirable that the apparatus used to contain the molten material be isolated to the extent possible from uncontrolled mechanical vibration. It may also be desirable that the means for controlling also be adapted to adjust the motion of the drive means based on other calculated or measured factors, either fixed or variable, such as the temperature gradient within the article, temperature of the molten bath, temperature at the article/bath interface or other factors. The steps of dipping 300 and withdrawing 500 require relative movement between the article and the molten material. For purposes of this method, either article, molten material, or both may be moved to accomplish this relative movement, although Applicants believe that it is generally preferred to move the article and hold the molten material stationary.

Figure 4:
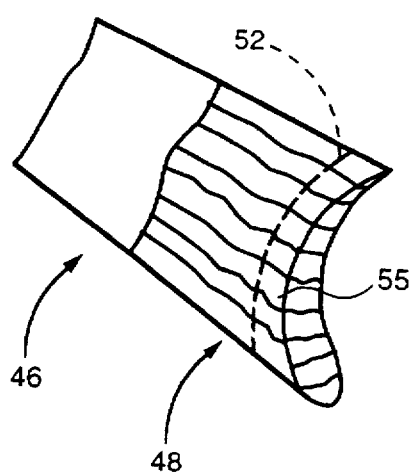
FIG. 4 is a fragmentary diagrammatic view of a repaired airfoil, shown with an extension formed according to the method of this invention, including multiple elongated grains.

An illustration of one of the possible results of the practice of one embodiment of the method of this invention is shown on airfoil section 46 of the type shown in FIGS. 3 and 4, as extension 56. Extension 56 extends from broken line 52 which designates the interface 14 within original blade tip 48 from which extension 56 comprising new blade tip 48 was grown, accounting for the melt back which occurs during these steps. As seen in the fragmentary, diagrammatic view of FIG. 4, using blade tip 48 as a growth seed results in solid extension 56 having a compatible microstructure, which in this example includes multiple elongated grains that are a continuation of and integral with those of the parent blade tip 48.

Figure 6:
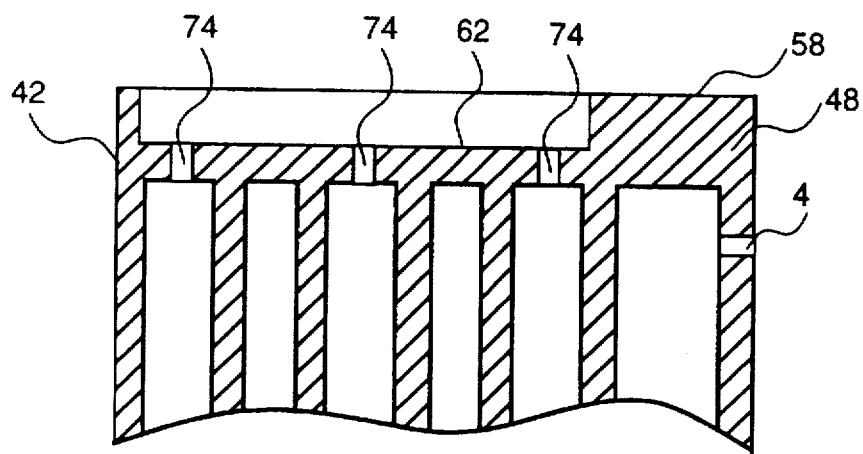
FIG. 6 is a sectional view of a portion of the blade tip of FIG. 5, taken along section line 6—6.

Another form of the tip portion of a gas turbine engine air cooled blade is shown in the fragmentary view of FIG. 5 and the sectional view of FIG. 6 taken along section line 6—6 of FIG. 5. This type of tip is sometimes referred to as a "squealer tip", because under certain operating conditions it can interfere with or rub on an opposing member to approach a zero clearance condition. As a result of such interference, peripheral rim 58 of blade tip 48 can be abraded or damaged. Even without such a rub condition, airborne particles and oxidation, over a period of operation, can abrade and contribute to the damage of rim 58. The method of the present invention can also be used to repair such damage by providing an extension in the manner described above, except that extension 56 (or extension 16 when considering the more general description of the method) in this instance may be an extension only of that portion of blade tip 48 comprising peripheral rim 58, rather than solid extension 56. In order to form the extension only on rim 58, contact of molten material with end wall 62 should be avoided.

Figure 7:
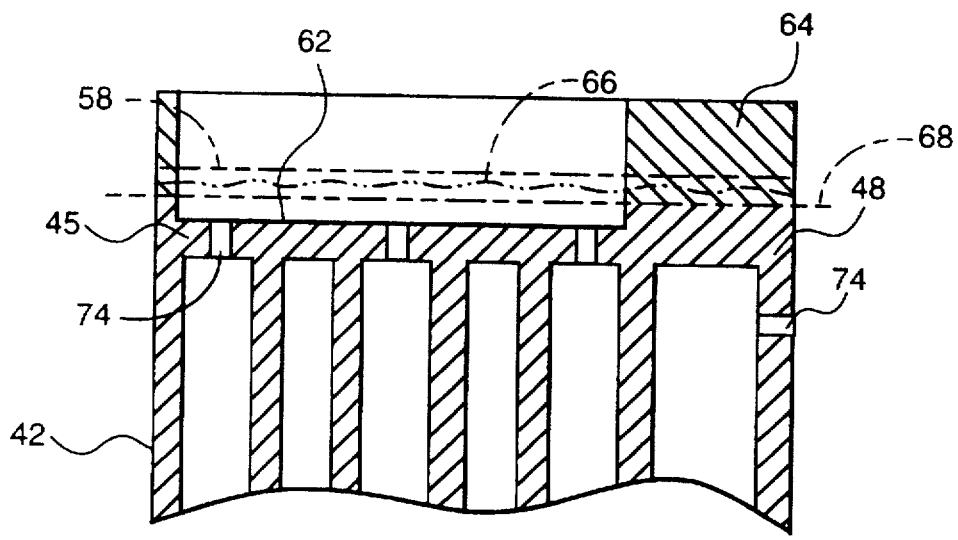
FIG. 7 is a sectional view of the portion of the blade tip of FIG. 6, including a sacrificial addition.

When rim 58 is narrow, or damage extends close to end wall 62, interaction of rim 58, with molten material 12 should be limited and carefully controlled in order to avoid damage to end wall 62, particularly if end wall 62 contains features such as channels 74 or holes that communicate with a partially-hollow interior, as described herein. One embodiment of the method of the present invention provides for use of sacrificial material or addition 64 carried by tip 48 on rim 58, as shown in FIG. 7. The edge or surface 66 of rim 58 in FIG. 7 is represented to be eroded, damaged and in need of repair. Sacrificial material 64 need not have the same microstructure as the blade tip 48, for example, a plurality of elongated grains or a single crystal. All that is required is that it be attached to rim 58 and be of a material which is compatible with the molten material. For example, if molten material 12 is a Ni-base superalloy, addition 64 can potentially be Ni, a Ni base alloy having elements which will not dilute or substantially change the composition of molten material 12, an alloy of one of the alloying elements of molten material 12, etc.. Sacrificial material 64 can be applied by a variety of methods well known in the art, including flame spraying, electro-deposition, welding, brazing or diffusion bonding of a preformed member; etc., provided that passageways 74 are unaffected. If the passageways are affected, additional operations may be required to reestablish communication with the interior of airfoil 42. Also, because sacrificial material 64 will, at a minimum, be partially melted away in the molten material during the practice of the method, the shape of addition 64 can be any convenient one. Addition 64 can be an extension of rim 58 as shown in FIG. 7. It can also be a shim, sheet or foil carried by rim 58; or it can comprise any other suitable configuration. The melting away of sacrificial material 64 by molten material 12 exposes the microstructure of rim 58 to molten material 12, thereby enabling such surface to act as a growth seed, according to this invention. Use of a sacrificial material 64 also facilitates the proper positioning of an article such as blade 42, as shown in FIG. 1, so that when blade 42, as shown, in FIGS. 5, 6 and 7 is being repaired, the melt back line 68 in FIG. 7 is located away from rather than at or in end wall 62. Without such sacrificial material, it might be required, in order to achieve complete contact of and interaction with molten material, to melt back rim 58 into end wall 62.

Figure 8:
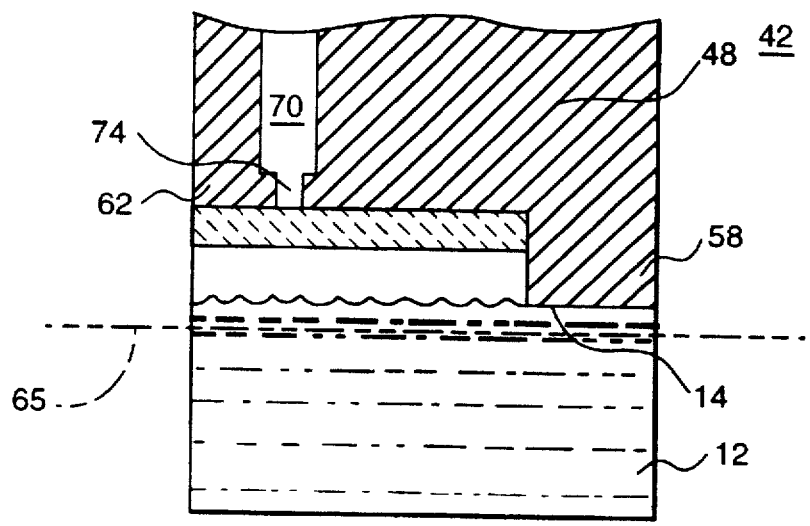
FIGS. 8, 9 and 10 are diagrammatic sectional views illustrating one embodiment of the steps of the method of the present invention on a partially hollow article.
Figure 9:
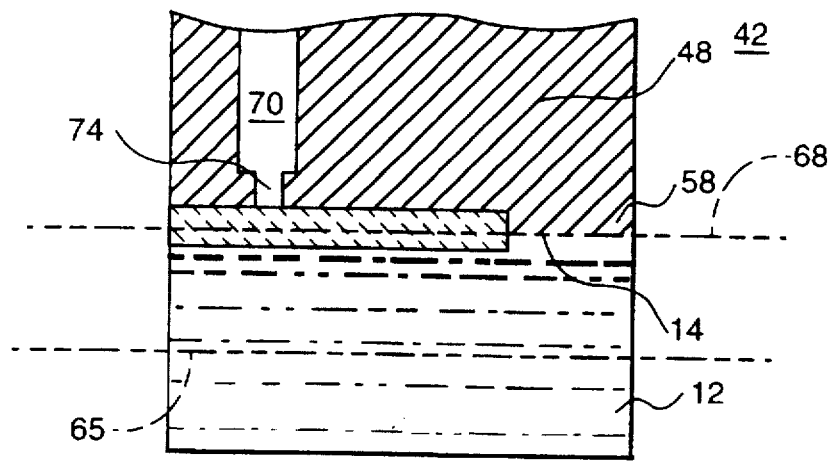
Figure 10:
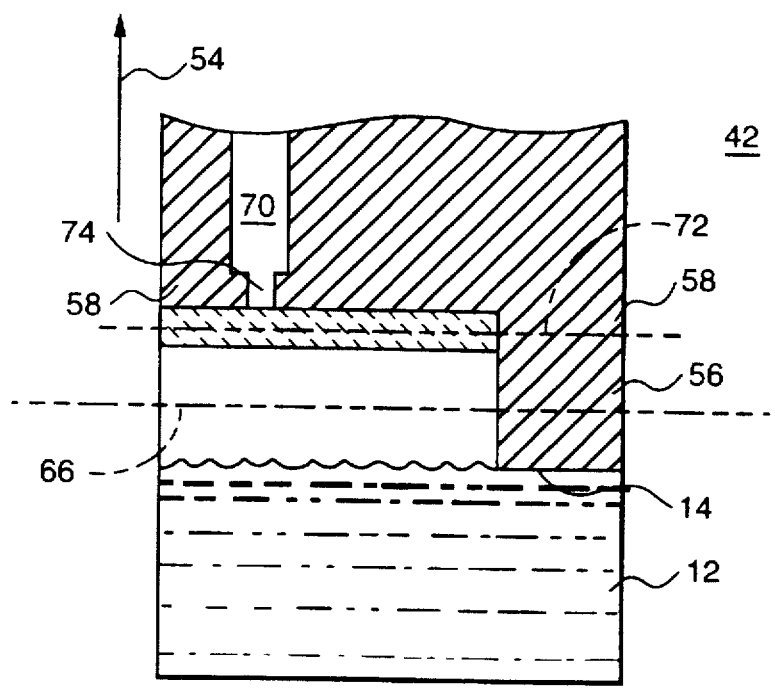

Referring to FIGS. 8–10, another way to protect end wall 62 is to use a barrier material carried by tip 48 within rim 58 or on end wall 62, or both. Barrier 65 will preferrably be formed from a material that will not melt or dissolve in, or otherwise contaminate, molten material 12. For Ni-base molten materials, ceramics or refractory metals may be used as barrier 65. A primary purpose of barrier 65 is to cover features such as passageways 74, to prevent them from being filled during the steps of dipping 300, holding 400 and withdrawing 500. Barrier 65 may also serve to assist in the definition of the new portion of blade tip 48, such as rim 58, while the extension is being solidified on rim 58 during withdrawing 500. Barrier 65 may be formed by any suitable method, such as by attaching a ceramic or refractory metal preform by brazing, welding, diffusion bonding to rim 58 or end wall 62, or by various deposition processes such as spray forming, physical vapor deposition, chemical vapor deposition, or by forming a ceramic from a slurry. After the steps of dipping 300, holding 400 and withdrawing 500, barrier 65 may be removed by any suitable material removal method.

The presentation of FIGS. 8, 9 and 10, which are diagrammatically in section, shows a sequence of the practice of the method of the present invention illustrating the repair of blade 42 having a hollow interior. For example, such interior can be serpentine or labyrinthine passages 70 in a fluid cooled turbine blade or vane 42. For convenience, some of the reference numerals are the same as have been used previously herein. FIG. 8 shows rim 58 in contact with and partially melted back by molten material 12 from the original rim edge shown as broken line 66. In FIG. 9, melt back has continued further into rim 58 to melt back line 68, sufficient for the remaining portion of rim 58 to act as a growth seed for the solidification of molten material 12. Then blade 42 is moved upwardly, as shown by arrow 54 in FIG. 10, while in contact with molten material 12 until extension 56, consisting of the portion of the section under broken line 72, is grown on rim 58 by solidification from melt line 68 through continued solidification at interface 14, as described above. If blade extension 56 is solid in some part, and additional holes are desired to allow communication with the hollow interior as described herein and illustrated in FIGS. 5–7, they may be formed using known methods. For example, such holes may be formed by drilling with laser, electrochemical or electro discharge methods well known and widely used in the art of material removal. It is contemplated by the method of this invention that if a molten material has a melting point lower than that of the article end acting as a growth seed, interaction between the molten material and growth seed need not include complete melting of the growth seed article end. All that is necessary is that a condition exist at the interface to allow crystal structure growth across the interface and into the molten material.

Referring again to FIGS. 1, 2A and 2B, the steps of dipping 300, holding 400, and withdrawing 500 extension end 8 from molten material 12 establishes a temperature gradient within article 2 that may be viewed as a gradient between interface 14 and base end 4, wherein the temperature at a given location within article 2 decreases from interface 14 to base end 4. The temperature gradient within a given article 2 will be a function of the temperature of molten material 12; the thermal conductivity of article 2; the configuration, including internal passages within article 2; the rate of withdrawal of article 2 and other factors, including the configuration of the apparatus used to perform this method and the presence of external sources of heating or cooling that may be applied to article 2 during these steps. As is well known in the art of solidification of molten materials, such as superalloys, the thermal gradient of the interface where the solidification is taking place effects the microstructure of the resultant article. For superalloys, relatively shallow thermal gradients, on the order of 10° C./cm, tend to produce less directional orientation and more equiaxed grain structures, due to perturbations resulting in non-undirectional heat flow. Steeper thermal gradients from, for example, 25°–150° C./cm, tend to produce conditions at the interface which promote the dendritic solidification of molten material 12 at interface 14. The temperature gradient within article 2, and particularly at the extension end and in the vicinity of interface 14, also affects the nature of the dendritic growth, including the spacing of the primary and secondary dendrites. Control of the temperature gradient at interface 14 is particularly important when it is desirable to produce particular directional morphologies and orientations, either polycrystalline directional solidification or single crystal growth, within the extension. The method of this invention may also include the use of optional steps to alter the temperature gradient within article 2. These steps may include: heating 600 the extension end of the article with an external (other than conduction from molten material 12) means for heating, removing heat 700 from the article using an external means for cooling the article, or simultaneously heating the extension end of the article with an external means for heating while also cooling 800 the article with an external means for cooling at a location other than the extension end. These optional steps may be used with any or all of the steps of dipping, holding, and withdrawing described herein. External means for heating are well known, such as the use of a separate induction coil positioned so as to heat the extension end of the article. External cooling means are also well known in the art of solidification, including the use of chills such as water-cooled chills, metal chill plates or other means. Such cooling means would commonly be attached to base end 4 or transition section 6 of article 2, however, a chill may also be attached to the extension end in circumstances where a heating means is not being utilized on this portion of the article. The use of these steps may be used to control the temperature gradient at both the interface and within the article.

It may be desirable for some configurations of article 2 and combinations of the steps of this method, to repeat the steps of dipping 300, holding 400, and withdrawing 500 article 2, with the same molten material or a different alloy composition, in addition to the repetition of the optional steps noted of material removal and/or heating or cooling in conjunction with these steps.

Referring again to FIGS. 2A and 2B, it will also be recognized by those skilled in the art of solidification from a molten material, that the extension formed using this method will generally be in an unfinished form, and will, therefore, frequently require the use of additional material removal and surface finishing steps, such as grinding, machining, polishing or other material removal and/or surface finishing steps in order to produce a finished extension.

EXAMPLE 1

An existing blading member in the form of a turbine blade made from an alloy composition of Ni-13.7 Al-7.9 Cr-12.3 Co-2.1 Ta-0.1 B-0.9 Mo-1.6 W-0.9 Re-0.6 C-0.5 Hf excepting impurities, in atom percent, was used as an article for the purpose of forming an extension according to the method of this invention. In this evaluation, it was desired to add an extension to the airfoil section of a turbine blade to simulate the repair of a tip as shown in FIGS. 3–10, and described herein. The microstructure of this cast blade comprised a plurality of directionally solidified grains, similar in orientation to those illustrated in FIG. 4. The material used to provide the molten material was also nominally the same alloy chemistry. A charge of this Ni-base superalloy was placed in a water-cooled, copper crucible that was located within a chamber that was adapted to be filled with argon gas. The chamber was filled with argon, and the alloy was melted in the crucible. The superalloy charge was melted in the crucible by use of an induction heating means, and heated to a temperature of 1400° C. The article was positioned within a holding means comprising a bolt to which the article was welded that was in turn attached to a drive means comprising a threaded drive rod with a digital encoder, for dipping, holding, and withdrawing the article. The drive means was interconnected to a means for controlling the motion of the drive means, comprising a computer-based controller, that was adapted to control the depth of insertion of the article into the extension end of the molten material, the hold time, and the rate of withdrawal. The blade was then lowered into the melt pool to a depth of approximately 1–5 mm, and held for 5 minutes. During this period, the blade interacted with the melt by melting back the inserted portion. Furthermore, the blade then acted as an oriented growth seed for solidification of the extension from the superalloy melt. The blade was then withdrawn by moving it upwardly, out of the melt, at a rate of approximately 10 mm/min. Withdrawal and directional solidification was continued until an extension of about 6 mm/min had been solidified. This allowed an extension to solidify having the same polycrystalline directionally solidified crystal structure as the blade. The extension was continuous and integral with the extension end of the article.

The article generated from the practice of this invention included a base and a partially hollow airfoil section having an outer cross-section. It did not contain a blade tip of a type described herein, only because it did not have an end wall. However, the configuration was such that the walls of the airfoil section had a thickness of approximately 6 mm, which closely approximates the peripheral rim in a typical turbine blade having an end wall as described herein. Therefore, this example closely approximates the microstructure and geometry of typical turbine blade tips, and serves to demonstrate the method of this invention for the growth or repair of such tips. The article used had a first crystal structure in the airfoil section comprising a plurality of directionally oriented elongated grains, and a first metallurgical structure based on the alloy composition of the article. Integral and continuous with the airfoil section was an extension having a second crystal structure as a continuation of and compatible with the first crystal structure of the airfoil section, and also having a second metallurgical structure that was also continuous and compatible with, but somewhat distinguishable from, the first metallurgical structure due to a slightly different dendrite arm spacing resulting from different thermal gradients used to grow the original article and the new blade end.

The interface portion between the airfoil section and the extension is different from those reported for related art methods, such as the diffusion bonding together of matched, separately generated, distinct members. It was similar in some respects to the interface described in the related art referenced patents that describe the continuous casting of blade tips. However, using the method described herein no potential exists for ceramic particulate contamination from the ceramic dies and die extensions of the related art method. Also, no means is necessary for applying a fluid pressure to the molten material in the method of this invention. The principal distinction between the present invention and much of the related art lies at the interface. In the present example, the extension maybe grown epitaxially by laying down one layer of atoms after another from the molten material selected for the extension onto the surface of the article. Thus, the grains of the extension may be continuous with those of the article across the interface between them. The method of the present invention further allows the secondary grain (dendrite) orientation to be grown, unlike the prior art interface bonding techniques for which such secondary grain orientation is difficult to match in the transverse direction. An epitaxially grown region, or repaired area, may be formed that matches the original metallurgical grain structure or orientation of the article not only in the primary, but also the secondary direction. The advantage over most related repair methods which have equiaxed grains at the interface and in the repaired area is significant in terms of mechanical and metallurgical properties, since the metallurgical grain structure of the original article does not match the extension or repaired area by use of most related art methods. Even where different alloys are selected for the body and extension, it is anticipated that there will generally be a gradation in metallurgical structure in the interface region as a result of rapid mixing of atomic species in the liquid adjacent to the solidified structure. Even though most related art methods are practiced with great care, there is a high likelihood of local surface irregularities and small misalignments between the body and a separate extension that may result in some sort of low angle boundary between the two parts. Likewise, there is a high likelihood that contaminating matter on either part will become trapped in the interface, thereby weakening the joint. Additionally, the related art practices for repairing such an article usually and disadvantageously close the passageways as the molten metal flows into them and solidifies. Additional machining operations then are required to reopen the passageways.

The preceding example demonstrated that controlled growth of extensions, of the type that would be required in airfoil blade tip repair, with similar cross-section as the parent airfoil, can be accomplished. Although this example included only one extension, it should be understood that the present invention can be expanded to include the concurrent growth of multiple extensions, such as a multiple turbine blade tips. The present invention may also be used for repair of other directionally oriented articles having passageways such as airfoil vanes.

As also noted in the referenced patents, although it was concluded that the crystal structure of the extension should be substantially the same as that of the existing article, it was unexpectedly found that considerable variation in metallurgical structure, notably alloy composition, between the extension and existing article is permissible, and may even be preferable in some cases. This result may also be applied to the utilization of the method of Applicants'invention.

The method of this invention has unexpected advantages over related methods for providing extensions for articles, such as airfoils, in several respects. Welded extensions must have compositions, melting characteristics, flow characteristics and potentially other properties that facilitate the use of the welding processes used to form them, and thus frequently have compositions that differ from the compositions of the articles to which they are added. Also, welded extensions typically have an equiaxed microstructure due to the nature of the welding processes used to form them, and thus do not form the directionally oriented microstructures that are possible with the method of this invention. Diffusion bonded or other bonded extensions are known to have interfaces that frequently contain defects, such as voids and/or low angle grain boundaries, as described herein. Thus, the interface between the extension and article may be weaker than desirable for certain applications. Related methods for casting extensions that are also referenced herein, utilize different forming methods that require the use of additional devices such as ceramic dies, die extensions and means for pressurizing the molten bath from which they are formed, that are not required for utilizing the method of the present invention. The fact that extensions having the desirable microstructural features described herein may be formed without the use of such additional devices, thereby reducing cost of forming such extensions and avoiding the potential for contamination by such devices, is a significant and unexpected advantage over these related art methods of casting extensions.

The foregoing embodiments have been disclosed for the purpose of illustration of the present invention, and are not intended to be exhaustive of the potential variations thereof. Variations and modifications of the disclosed embodiments will be readily apparent those skilled in the art. All such variations and modifications are intended to be encompassed by the claims set forth hereinafter.

What is claimed is:

1. A method for providing an integral extension on an end of an article, comprising the steps of:

selecting an article having a base end, a transition section, an extension end having an outer cross-sectional shape, a directionally oriented microstructure and a superalloy composition, whereby the transition section joins the base end and the extension end;

providing a molten material having an alloy composition that is compatible with the superalloy composition of the article;

dipping the extension end of the article into the molten material;

holding the extension end of the article in contact with the molten material for a time sufficient to allow a portion of the extension end to be heated by and interact with the molten material as a microstructure growth seed; and withdrawing the extension end from the molten material at a rate which causes the molten material to solidify on the growth seed at an interface between them as an integral extension having a microstructure that is compatible with the directionally oriented microstructure of the article, whereby during the step of withdrawing, the article has a temperature gradient such that the temperature decreases between the interface and the base end.

2. The method of claim 1, further comprising the step of agitating at least one of the molten material and the article during one of the step of dipping and holding.

3. The method of claim 1, further comprising the step of heating the extension end of the article with external means for heating during any of the steps of dipping, holding, or withdrawing, whereby the temperature gradient at the interface and within the article may be controlled.

4. The method of claim 1, further comprising the step of cooling the article with external means for cooling during any of the steps of dipping, holding or withdrawing, whereby the temperature gradient at the interface and within the article may be controlled.

5. The method of claim 1, further comprising the steps of heating the extension end of the article with external means for heating while also cooling the article at a location other than the extension end of the article with external means for cooling during any of the steps of dipping, holding, or withdrawing, whereby the temperature gradient at the interface and within the article may be controlled.

6. The method of claim 1, wherein the integral extension has a directionally oriented microstructure.

7. The method of claim 6, wherein the directionally oriented microstructure of the integral extension is substantially an epitaxial extension of the directionally oriented microstructure of the extension end of the article.

8. The method of claim 1, further comprising the step, prior to the step of dipping, of securing a sacrificial material on the extension end of the article that is compatible with and will melt in the molten material, and that is adapted to expose a portion of the extension end of the article on which the integral extension is to be solidified to the molten material.

9. The method of claim 1, further comprising the step, prior to the step of dipping, of securing a barrier material on the extension end of the article having a higher melting point than the molten material, and that is adapted to expose a portion of the extension end of the article on which the integral extension is to be solidified to the molten material.

10. The method of claim 1, wherein the molten material and the article have the same composition.

11. A method for providing an integral tip extension on an end of an airfoil, comprising the steps of:

selecting an airfoil having a root, an airfoil section, a tip having an outer cross-sectional shape, a directionally oriented microstructure and a superalloy composition; whereby the airfoil section joins the root and the tip;

providing a molten material having an alloy composition that is compatible with the superalloy composition of the airfoil;

dipping the tip of the airfoil into the molten material;

holding the tip of the airfoil in contact with the molten material for a time sufficient to allow a portion of the tip to be heated by and interact with the molten material as a microstructure growth seed; and withdrawing the tip from the molten material at a rate which causes the molten material to solidify on the growth seed at an interface between them as an integral tip extension having a microstructure that is compatible with the directionally oriented microstructure of the airfoil, whereby during the step of withdrawing, the airfoil has a temperature gradient such that the temperature decreases between the interface and the root.

12. The method of claim 11, further comprising the step of agitating at least one of the molten material and the article during one of the step of dipping and holding.

13. The method of claim 11, further comprising the step of heating the tip of the airfoil with external means for heating during any of the steps of dipping, holding or withdrawing with an external means for heating, whereby the temperature gradient at the interface and within the airfoil may be controlled.

14. The method of claim 11, further comprising the step of cooling the airfoil with external means for cooling during any of the steps of dipping, holding or withdrawing, whereby the temperature gradient at the interface and within the airfoil may be controlled.

15. The method of claim 11, further comprising the steps of heating the tip of the airfoil while also cooling the airfoil at a location other than the tip of the airfoil with external means for cooling during any of the steps of dipping, holding or withdrawing, whereby the temperature gradient at the interface and within the airfoil may be controlled.

16. The method of claim 11, wherein the integral tip extension has a directionally oriented microstructure.

17. The method of claim 11, wherein the directionally oriented microstructure of the integral tip extension is substantially an epitaxial extension of the directionally oriented microstructure of the tip of the airfoil.

18. The method of claim 11, further comprising the step, prior to the step of dipping, of securing a sacrificial material on the tip of the airfoil that is compatible with and will melt in the molten material, and that is adapted to expose a portion of the tip of the airfoil on which the integral tip extension is to be solidified to the molten material.

19. The method of claim 1, further comprising the step, prior to the step of dipping, of securing a barrier material on the tip of the article having a higher melting point than the molten material, and that is adapted to expose a portion of the tip of the airfoil on which the integral tip extension is to be solidified to the molten material.

20. The method of claim 11, wherein the molten material and the airfoil are both Ni-base, Fe-base, Co-base, Ti-base, or Nb-base superalloys.

21. The method of claim 20, wherein the molten material and the airfoil have the same composition.

22. The method of claim 11, wherein the rate of withdrawing the tip is $\geq 0.1$ mm/min.

* * * * *